UNITED STATES PATENT OFFICE.

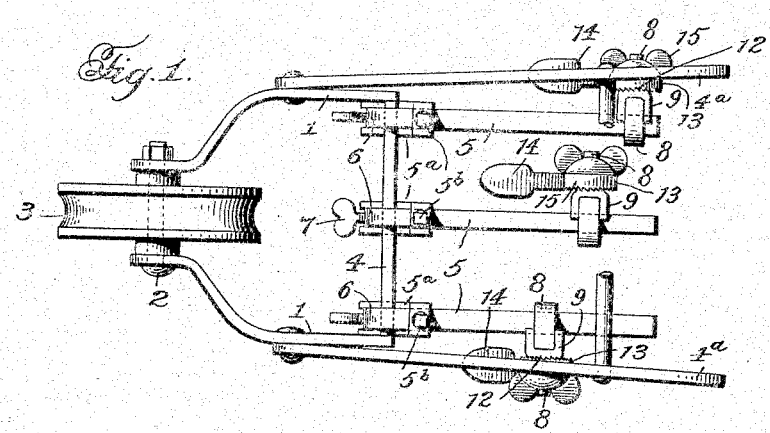

JOSEPH GILLIS LUNDY, OF EVERGREEN, ALABAMA.

GARDEN PLOW OR CULTIVATOR.

1,340,784.  Specification of Letters Patent.  Patented May 18, 1920.

Application filed October 9, 1919. Serial No. 329,484.

*To all whom it may concern:*

Be it known that I, JOSEPH G. LUNDY, a citizen of the United States, and a resident of Evergreen, in the county of Conecuh and State of Alabama, have invented certain new and useful Improvements in Garden Plows or Cultivators; and I do hereby declare the following to be a full, clear, and exact description of the invention, such as will enable others skilled in the art to which it appertains to make and use the same.

My invention relates to an improvement in garden plow or cultivator, the object being to provide an implement with one or a plurality of shovels or plows that may be so arranged to permit the implement to be used with single, double or triple plows or shovels, the parts being constructed so that the implement may be readily converted from one form of implement to another.

With these objects in view my invention consists in the parts and combinations of parts and in the details of construction as will be more fully explained and pointed out in the claims.

In the accompanying drawings, Figure 1 is a view in perspective of my improved implement. Fig. 2 is a view in longitudinal section of the same. Fig. 3 is a view of one of the beams detached, Fig. 4 is a view of one of the plows and its securing clamp and screw removed and separated and Fig. 5 is a view in perspective of the clamp.

The improvements herein claimed may be applied to either a hand or horse drawn implement, hence I would have it understood that I do not confine the use of the invention herein disclosed to any particular type of implement but on the contrary intend them for use either with horse drawn device or the smaller hand operated garden type.

The frame of the implement consists of two side members 1 bent inwardly at their front ends and carrying an axle 2 on which the front ground wheel 3 is mounted to rotate, and a cross-bar 4 connecting the rear ends of the side member. Handle bars 4ᵃ are mounted at their lower end to the side member 1 and are of a length sufficient to project rearwardly behind the beams 5. Each beam 5 is provided with a hook shaped head 6, the slot of the hook adapted to make a close fit over the cross section of the cross-bar 4 on which the beams are mounted. That is to say each head is provided with a hook of sufficient size to receive the cross-bar and permit the beam to be readily adjusted laterally thereon, but hold it against vertical tilting so that the construction of the cross-bar 4 and the shape of the hooks on the beams 5 tend to hold the latter rigidly in the plane of the side members 1, but permit of their free lateral adjustment toward and away from each other, the beams being locked if desired against movement by the set screws 7 which pass through the head of the beams and engage the front face of the bar 4 at the center.

The beams are secured to the cross-bar against vertical displacement by the clamps 5ᵃ, one for each beam. Each clamp has an opening through the same conforming in shape, and approximately in size, to the cross-section of the beams so that it may be slid on the beam toward and away from the hook 6 and is bent as shown to pass under the beam and will engage the same or be sufficiently close thereto to prevent the upward displacement of the hook 6 on the beam, and when the parts are so adjusted the clamp is locked by the set screw 5ᵇ carried by the clamp and adapted to engage and bind against the top face of the beam 5. I prefer to bifurcate the front end of the clamp so that it will straddle the lower free end of the hook, but in the large horse or tractor drawn implement I may provide the front end of the clamp with a hole to receive the free end of the hook so as to prevent the possibility of the latter from spreading under abnormal pulling stresses.

Each beam 5 is square in cross section and of a length sufficient to permit of the necessary adjustment of the plows back and forth thereon, and each beam is provided with a clamping bolt 8 the head of which has an angular opening to receive the beam. A clamping block 9 is provided with a central opening 10 for the passage of the shank of bolt 8 and with a groove 11 which overlaps the adjacent edge of the head of the bolt and the opening therein for the beam, so that when the parts are assembled and secured together the edges of the clamping block bear against the side of the beam and lock the clamping bolt to the latter. The opposite face 12 of the clamping block 9 is provided with corrugations radially arranged to engage a similarly serrated and rigid surface on the head 13 of the plow standard 14. This head of the plow standard is provided with a round hole for the passage of the cylindrical end of the shank of the bolt 8, and is held on the latter by the thumb nut 15 screwed onto the end of the bolt. Each beam of the plow is provided with the clamping bolt, friction block and nut as above described, hence a description of one suffices for all.

With this construction the beams 5 can be adjusted laterally on the cross-bar 4 of the frame and the plows can be adjusted longitudinally on the beams, or turned up out of the way or removed so that the implement may be converted into a single, double or triple tooth plow, cultivator or harrow; the plows or teeth can be arranged in V or inverted V form or in the same transverse vertical plane; parallel or otherwise, right or left hand plow, harrow or cultivator. I prefer to detachably connect the cross bar 4 to one or both the side members 1 of the frame, so that any one or more of the beams 5 can be removed from the cross-bar for the purpose of repair or renewal or for getting them out of the way when it is desired to add or remove a beam or beams.

Again I would have it understood that the construction of the plows or teeth are immaterial, as my invention relates to the manner of assemblage and adjustment and not to the details of construction of the same.

It is also evident that other slight changes might be made in the relative construction and arrangement of parts shown and described without departing from the spirit and scope of my invention. Hence I would have it understood that I do not wish to confine myself to the exact construction and arrangement of parts shown and described, but—

Having fully described my invention what I claim as new and desire to secure by Letters-Patent, is:

1. In an agricultural implement, the combination of a frame having a cross bar, a beam having a hook shaped end to engage the cross bar, and a clamp on the beam and engaging the end of the hook below the cross bar.

2. In an agricultural implement, the combination of a frame having a cross bar, a beam having a hook shaped end to receive said cross bar, the said beam being laterally adjustable on the bar, and a clamp carried by the bar at the rear of the hook and engaging the free end of the latter below the bar so as to clamp the beam to the bar.

3. In an agricultural implement, the combination of a frame having a rear cross bar which is straight from side to side, a series of plow beams each having a hook shaped end to hook over the cross bar, each beam being laterally adjustable on the bar independently of the other and a clamp on each beam, each clamp passing under the bar and embracing the lower end of its beam.

4. In an agricultural implement, the combination of a frame having a rear cross-bar, a series of beams, each having a slotted head to receive the cross bar, the said beams being laterally adjustable on the bar, a movable clamp carried by each beam and closing the open end of the slot in the latter, and a set screw for locking the clamp to the beam.

In testimony whereof, I have signed this specification in the presence of two subscribing witnesses.

JOSEPH GILLIS LUNDY.

Witnesses:
MARY HENDERSON,
J. D. WRIGHT.